United States Patent [19]

Jorgensen et al.

[11] Patent Number: 4,642,443
[45] Date of Patent: Feb. 10, 1987

[54] APPARATUS FOR BREWING COFFEE IN MICROWAVE OVENS

[75] Inventors: Jorgen A. Jorgensen, Bloomington; Donald W. Nygren, St. Louis Park, both of Minn.

[73] Assignee: Northland Aluminum Products, Inc., Minneapolis, Minn.

[21] Appl. No.: 608,810

[22] Filed: May 10, 1984

Related U.S. Application Data

[63] Continuation of Ser. No. 321,889, Nov. 16, 1981, abandoned.

[51] Int. Cl.[4] .................................................. H05B 6/80
[52] U.S. Cl. ........................ 219/10.55 E; 219/10.55 F; 99/308; 99/DIG. 14
[58] Field of Search ................. 219/10.55 E, 10.55 F, 219/10.55 R, 10.55 M; 99/308, 309, 310, 311, 312, 302 R, 300, DIG. 14, 451

[56] References Cited

U.S. PATENT DOCUMENTS

| 227,805 | 5/1880 | Matthes | 99/312 X |
|---|---|---|---|
| 1,438,639 | 12/1922 | Ellis et al. | 99/312 X |
| 2,557,317 | 6/1951 | Serio | 99/312 X |
| 2,601,067 | 6/1952 | Spencer | 219/10.55 E |
| 2,612,596 | 9/1952 | Gross | 219/10.55 F |
| 3,941,967 | 3/1976 | Sumi et al. | 219/10.55 E |
| 3,965,323 | 6/1976 | Forker, Jr. et al. | 219/10.55 E |
| 3,974,354 | 8/1976 | Long | 219/10.55 E |
| 4,104,957 | 8/1978 | Freedman et al. | 219/10.55 E X |
| 4,170,931 | 10/1979 | Fajans | 99/312 |

FOREIGN PATENT DOCUMENTS

| 64 | 1/1879 | United Kingdom | 99/308 |
|---|---|---|---|
| 12077 | 7/1891 | United Kingdom | 99/308 |

Primary Examiner—Philip H. Leung
Attorney, Agent, or Firm—Orrin M. Haugen; Thomas J. Nikolai; Frederick W. Niebuhr

[57] ABSTRACT

A coffee brewing appliance for making coffee by the percolation method in microwave ovens. The coffee maker is provided with a perforated metal enclosure with rounded edges to contain and protect the ground coffee particles from burning or charring which would otherwise be induced by microwave energy. The perforations are small enough to exclude microwave energy. The coffee maker is also provided with a housing which is microwave transmissive and which separates and insulates the metal portion from the microwave oven bottom and side walls. The housing and pump structures enhance the percolator pump action.

3 Claims, 7 Drawing Figures

APPARATUS FOR BREWING COFFEE IN MICROWAVE OVENS

This is a continuation of application Ser. No. 321,889 filed Nov. 16, 1981, now abandoned.

BACKGROUND OF THE INVENTION

This invention relates to a microwave coffee brewing appliance of the percolation type. It is adapted to be used within the cavity of a microwave oven to brew coffee in a relatively short time by comparison with conventional coffee brewing methods. Conventional percolators are designed for stove top use or contain an internal heating element. The stove top variety is designed to be placed over a heat source which heats the bottom of the percolator and delivers much of the heat to water confined beneath the domed base of the percolator pump. Those with an internal heating element are constructed so the heating element directly heats the water below the domed base of the percolator pump. This placement of the heat source or heating element below the base of the percolator pump enhances percolation pump action in a fashion not available in a microwave oven.

Microwave coffee makers have been made in the past for making coffee by other methods, such as shown and described in U.S. Pat. No. 2,601,067 to Spencer which discloses a coffee maker with a lower sealed chamber with a tube from the upper chamber projecting downwardly into the lower chamber. When the water in the lower chamber is heated, steam pressure pushes the water upward through the coffee particles into the upper chamber. When the water is cooled, it flows back down through the coffee in a two pass process similar to the one pass drip process.

Another microwave coffee maker for microwave use is disclosed in U.S. Pat. No. 4,104,957 to Freedman et al, which shows a drip-type coffee maker with upper and lower chambers with the water in the upper chamber and the coffee in a filter basket between the two chambers. Upon reaching the desired temperature, the water flows down through a temperature activated valve in a one pass drip process.

The only other known use of microwave heating for making coffee and which has been commonly used is to boil water in a microwave oven for use in making instant coffee.

None of these structures or methods for use in microwave ovens produces coffee by percolation, with the distinctive taste imparted by percolation, or with the flexibility of the percolation process whereby variation of the percolation time will change the strength of the brewed coffee.

SUMMARY OF THE INVENTION

The present invention relates to coffee brewers made to operate by means of microwave radiation within the cavity of a microwave oven. Specifically, we have been successful in providing a coffee percolator which may be used in a microwave oven.

One of the objects of this invention is to provide a percolator-type coffee maker which will function as a percolator in a microwave oven.

Another object of the invention is to provide a metal container for the coffee particles to shield the coffee from burning and charring which would otherwise be caused by the microwave energy employed in a microwave oven.

Still another object of the invention is to provide a coffee maker wherein the shape and placement of the metal elements will not cause arcing or other adverse effects to the coffee maker or the microwave oven.

With these and other objects in view the invention broadly comprises a coffee percolator having a microwave transmissive housing, a metallic basket suitable for holding ground coffee, the basket being mounted within the housing, and the housing being constructed to prevent the metallic portion from coming close to the side of the housing.

DESCRIPTION OF THE PREFERRED EMBODIMENT

Figure 2:
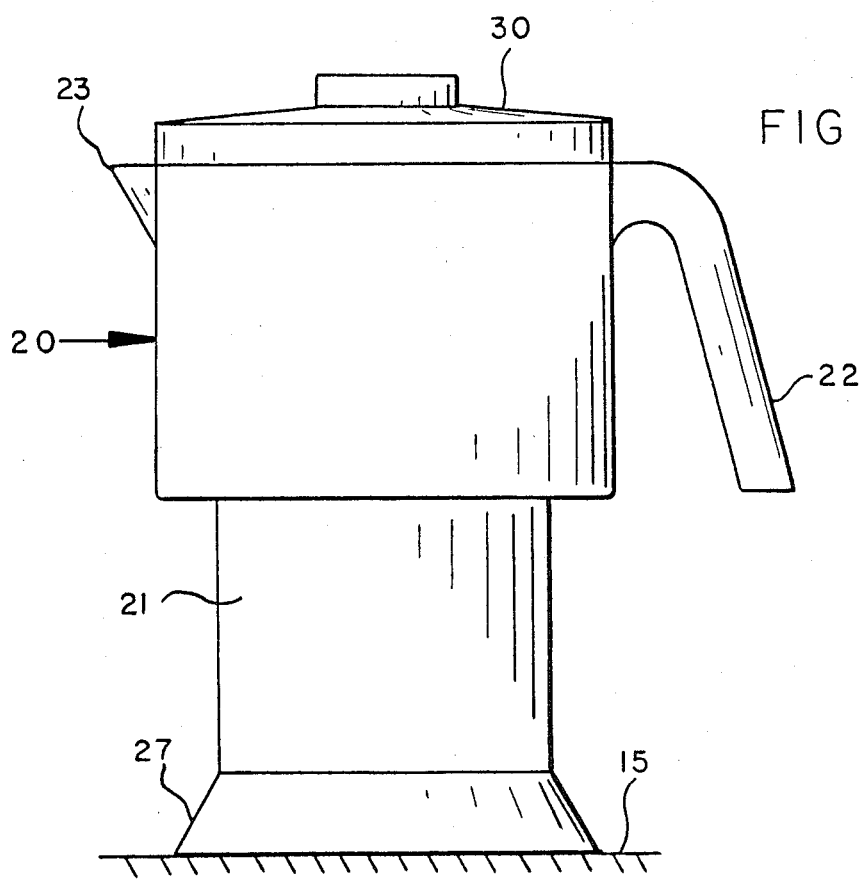
FIG. 2 is a side elevation of the coffee maker.
Figure 3:
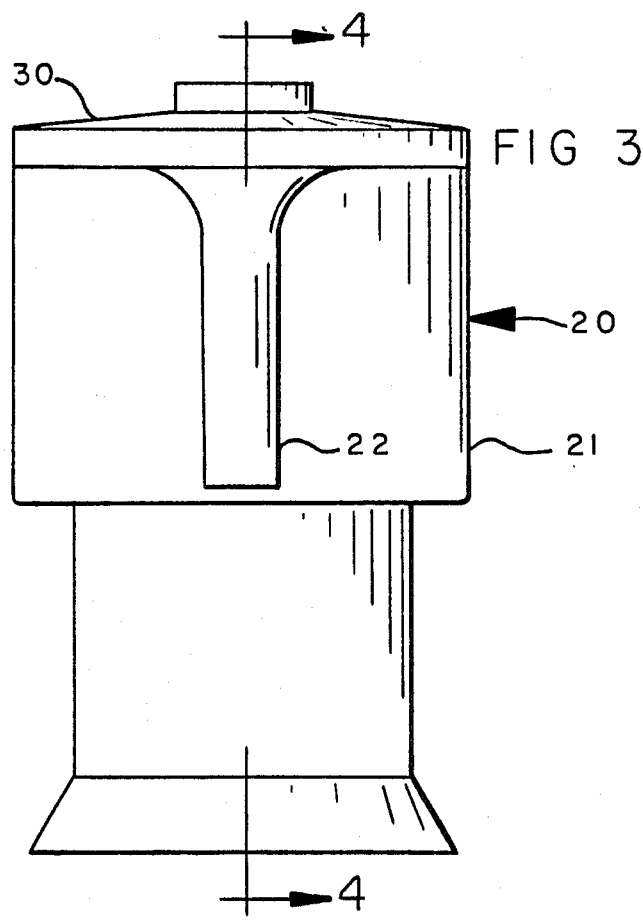
FIG. 3 is a rear elevation.

Referring now more particularly to the drawings, reference numerals will be used to denote like parts or structural features in the different views. The numeral 10 denotes generally a conventional microwave oven of boxlike configuration with controls 11, and hinged front door 12 having a transparent window 14 mounted therein. The bottom or floor of the oven upon which the coffee maker rests is shown at 15 in FIG. 2.

The microwave coffee maker itself forming the subject of the present invention is designated generally by the numeral 20. It has a generally cylindrical overall shape and the construction thereof will best be understood, by reference to FIG. 4. Alternate shapes such as a generally boxlike shape with square or rectangular horizontal section may be employed as well as the cylinder with circular horizontal section as shown.

Figure 4:
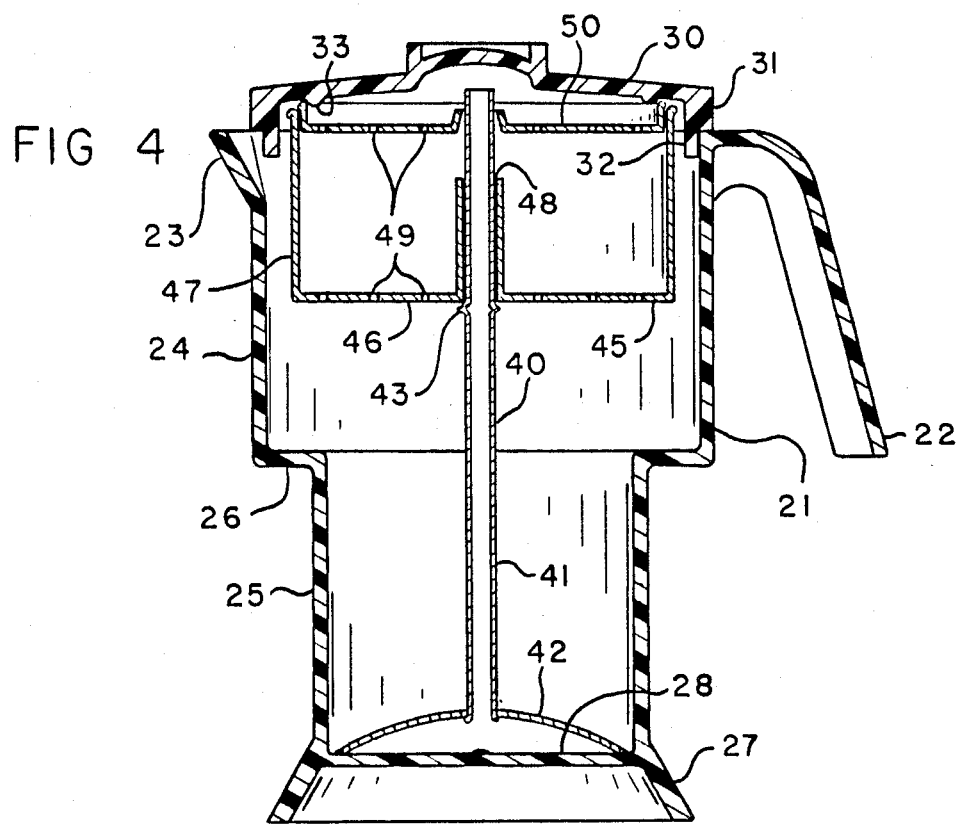
FIG. 4 is a vertical section through the coffee maker taken on line 4—4 of FIG. 3.

The coffee maker 20 has an outer housing 21 which is shown generally cylindrically shaped and which in the preferred embodiment has reduced diameter at the bottom. This may be accomplished with a tapered shape or by joining together two or more cylindrical sections. FIG. 4 shows housing upper side wall 24 above lower side wall 25 which is of lesser diameter joined by horizontal section 26. The housing 21 has a handle 22 and spout 23 formed therein and is provided with base extension 27 which spaces the bottom 28 of housing 21 upwardly from the oven bottom 15. Housing 21 functions as a coffee pot for holding and pouring brewed coffee.

Housing 21 is formed of a material which is temperature resistant and which is highly transmissive or transparent to microwaves, having a low dielectric constant and having a low dissipation factor. This material will hereafter be referred to merely as "microwave transparent material."

A housing cover 30, also of said microwave transparent material, is horizontally circular and adapted to mate with and fit onto the top of housing 21 so as to cover the open top of housing 21. Cover 30 has a cylindrical edge 31 of the same outer diameter as that of upper side wall 24. Cylindrical edge 31 of cover 30 is thicker than upper side wall 24 and a lower portion 32 of edge 31 has reduced outer diameter to fit inside the top of upper side wall 24.

A circular protrusion 33 on the underside of cover 30 is about the same diameter as that of lower side wall 25.

A percolator pump denoted generally at 40 is disposed within the coffee maker housing 21 resting upon the housing bottom 28. The percolator pump 40 consists of a tube 41 and domed base 42 which may be separate pieces or of one piece. The base 42 and tube 41 may be of microwave transparent material or of metal and if of metal, as shown in FIG. 4, the housing base extension 27 provides required spacing between the oven bottom 15 and these components.

Figure 5:
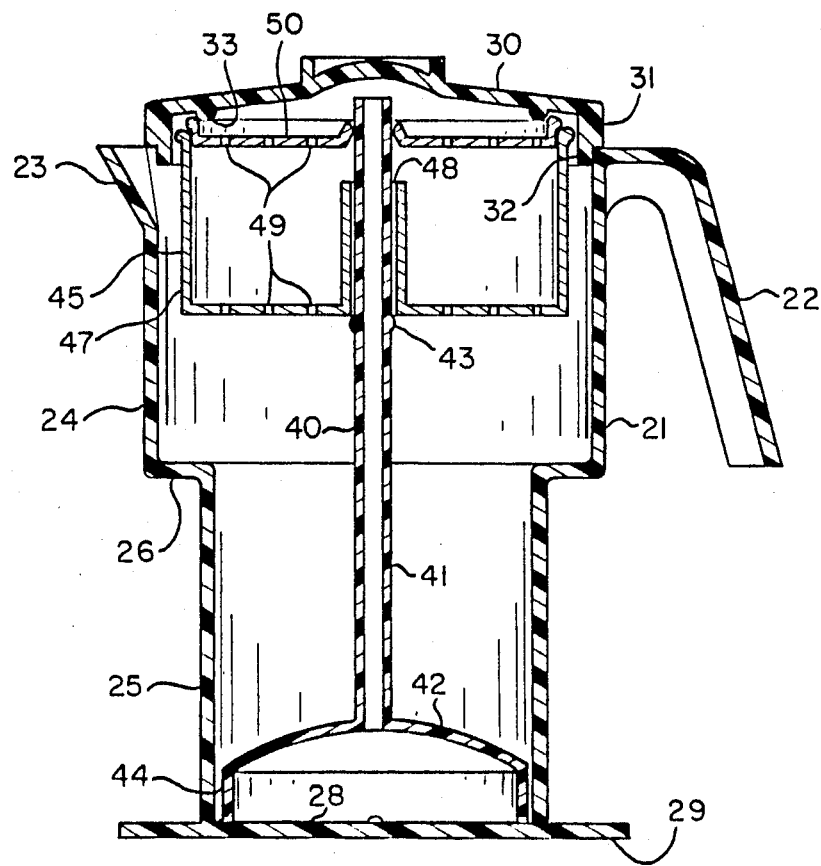
FIG. 5 is a vertical section through an alternate embodiment of the maker taken on the same line as is FIG. 4.

An alternate embodiment is shown in section in FIG. 5. In the alternate embodiment, pump 40 is made of microwave transparent material. In this embodiment, the base extension 27 has been removed and a horizontal extension 29 of base 28 has been added for stability. In this embodiment, lower side wall 25 of housing 21 extends to bottom 28 which is not elevated off the floor 15 of the microwave oven 10. However, pump base 42 has a vertical extension 44 which raises the height of domed base 42. The vertical extension 44 may be generally cylindrical or tapered inward at the top where it meets the dome 42. There is more water contained beneath the domed pump base 42 than in a percolator pump of conventional construction.

Figure 6:
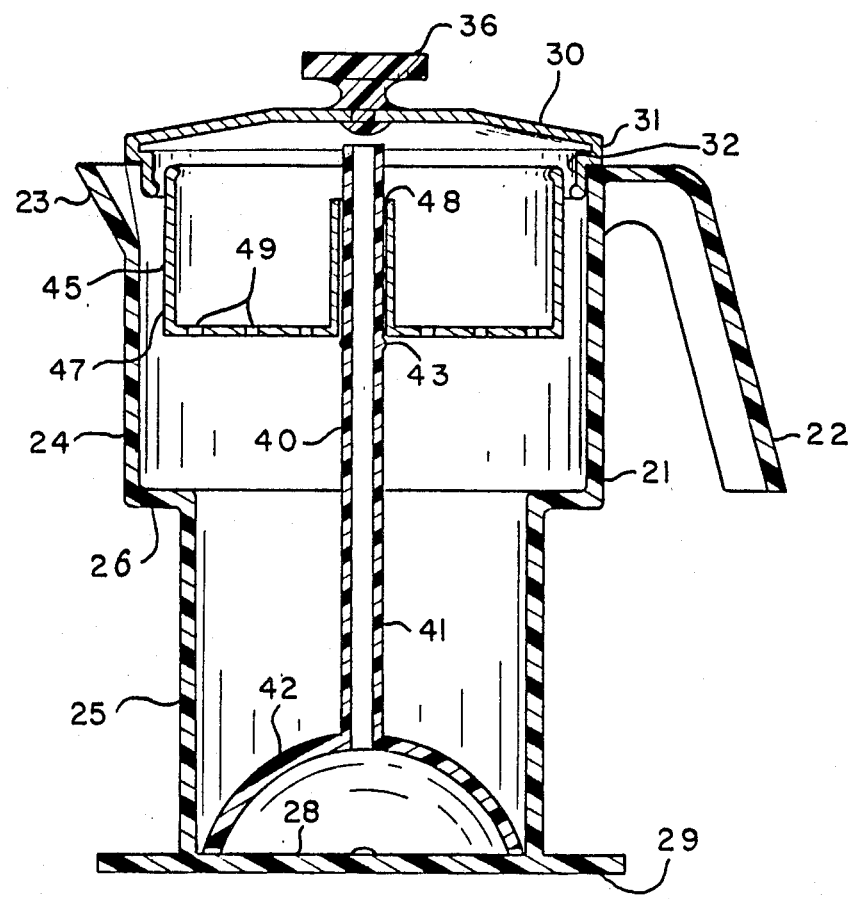
FIG. 6 is a vertical section through another alternate embodiment of the coffee maker taken on the same line as is FIG. 4.

Another embodiment is shown in FIG. 6. In this embodiment there is no vertical extension 44, but the domed pump base 42 itself is made higher than in conventional construction so that a greater amount of water is enclosed.

The housing base extension 27 shown in FIG. 4 may be combined with the extended pump base 42 as shown in FIG. 5 or with the higher pump base 42 shown in FIG. 6.

Tube 41 has a horizontal protrusion 43 part way up the height of tube 41 adapted to hold a basket 45 with bottom 46 and side wall 47. Protrusion 43 supports basket 45 near the top of housing 21 well above horizontal section 26, the basket's vertical height being substantially less than that of upper side wall 24. The basket 45 is provided with an opening 48 at the center of the bottom 46 so that it may fit over tube 41 and rest upon protrusion 43. Basket 45 is provided with a cover 50 which also fits upon tube 41 and mates with basket 45 to completely enclose the contained space. Both basket 45 and cover 50 are perforated with a number of small perforations 49. In use, basket 45 contains ground coffee (not shown) suitable for use in preparing an infusion of coffee.

Both basket 45 and cover 50 are shown formed of metal. The perforations 49 in the basket 45 and cover 50 are small enough to exclude microwave radiation so that the ground coffee within basket 45 is shielded from microwave energy to prevent charring or burning of the ground coffee which would impart a bitter or undesirable taste. The basket 45 and cover 50 may also be formed of microwave transparent materials which will not prevent the coffee maker from functioning, but the contained ground coffee will be exposed to microwave energy which will produce some charring, and this will result in somewhat poorer quality brewed coffee which, however, may be quite acceptable to some tastes.

Basket 45 is sized to fit adjacent the circular protrusion 33 of housing cover 30 so that protrusion 33 holds cover 50 and thereby metal basket 45 away from upper side wall 24 of housing 21. This in turn ensures that basket 45 will be properly separated from the sides (not shown) of the microwave oven 10.

In the alternate embodiment shown at FIG. 6, the basket cover 50 is eliminated, and the housing cover 30 is made of metal. Housing cover 30 mates with basket 45 to form a metal enclosure to shield the ground coffee in basket 45. Cover handle 36 is formed of microwave transparent material and serves to separate housing cover 30 from the top of the microwave oven cavity.

Figure 7:
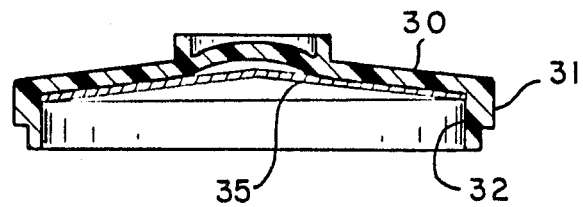
FIG. 7 is a vertical section through an alternate embodiment of the cover shown in FIG. 6.

A further alternate embodiment of housing cover 30 is shown at FIG. 7. In that embodiment, housing cover 30 is formed of microwave transparent material. A metal insert 35 inside housing cover 30 serves to shield the top from microwave energy as does housing cover 30 in the embodiment at FIG. 6. The housing cover 30 itself being about metal insert 35 serves to isolate metal insert 35 from the top of the microwave oven cavity.

Cover 30 is structured so that it extends a minimal distance above basket 45 to reduce overall height. The base 42 of pump 40 is sized to fit within lower side wall 25 of housing 21 so that base extension 27 or horizontal extension 29 of base 28 and upper side wall 24 separate base 42 from the sides (not shown) of microwave oven 10. Base 42 and tube 41 of pump 40 may also be made of microwave transparent material.

Regardless of material of pump 40, base extension 27 of housing 21 raises bottom 28 of housing 21 a distance above the floor 15 of microwave oven 10. In the alternate embodiment shown at FIG. 5 the domed base 42 of pump 40 is raised by vertical extension 44, and in the further alternate embodiment shown at FIG. 6 the domed base 42 of pump 40 is higher because the domed base 42 itself has greater vertical extent than conventional percolator pumps. This raising of the domed pump base 42 puts the base 42 and the water (not shown) beneath it higher in the microwave oven 10. It has been found experimentally that in microwave ovens of conventional design there is a greater energy level about an inch above the oven floor 15. Raising the domed pump base 42 and the water beneath into this area of greater energy enhances pump action.

Housing cover 30 may in an alternate embodiment fit into the housing 21, but structure such as circular protrusion 33 of cover 30 or a flange (not shown) on the inside of housing 21 to ensure separation of basket 45 from the housing upper side wall 24 is needed to keep the basket 45 distant from the upper side wall 24 and hence the oven sides (not shown).

Figure 1:
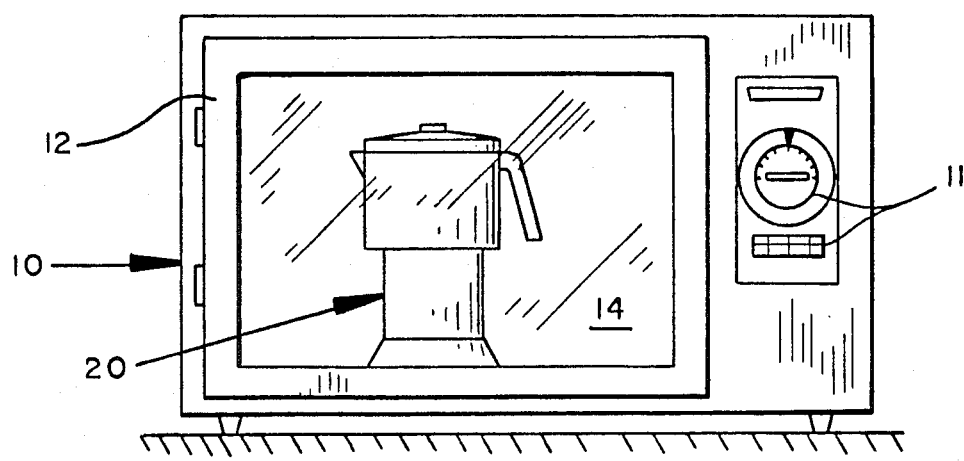
FIG. 1 is a front elevation of a conventional microwave oven with a transparent window in the front door showing the coffee maker positioned on the bottom or bottom shelf of the oven as used in preparation of percolated coffee.

When ground coffee (not shown) is placed in basket 45 and water (not shown) added to housing 21, the unit may be assembled as shown in FIG. 4 and then placed into a microwave oven 10 as shown in FIG. 1. Activation of oven 10 will not cause any adverse effect upon the ground coffee within and shielded by basket 45. However, microwave energy will pass through housing 31 to heat the water contained therein.

Base extension 27 of housing 21 spaces bottom 28 of housing 21 and water contained therein upward from bottom 15 of the microwave oven 10 to an area of greater concentration of microwave energy and so that microwave energy may be reflected upward through bottom 28 of housing 21 to heat that water beneath base 42 of percolator pump 40. It is this water below base 42 of pump 40 which must activate the pump 40. The alternate embodiments shown in FIG. 5 and FIG. 6 have a plastic pump 40 so that microwave energy may enter from the sides as well as below to heat the water below pump base 42. When this water reaches a temperature near boiling, percolation will occur with water and steam ejected from the top of pump tube 41. Cover 30 will stop the water's upward travel and direct it onto basket cover 50 where it may drip through the ground coffee within basket 45 and thence back into the lower portion of housing 21 to produce freshly brewed coffee. Since microwave heating of the water is very rapid, fresh perked coffee may quickly be produced by the coffee maker 20.

Even with the enhanced percolator pumping action, produced by the structure described above, a percolator operating in a microwave oven 10 does not have the very strong bottom heating present in stove top or internally heated percolators, and the percolation or pumping action is necessarily weaker. This becomes a more important factor when a partial pot of coffee is brewed. The structure of housing 21 reduces the amount of heating required for percolation in this situation.

The housing 21 has lower side wall 25 of dimension just sufficient to allow insertion of pump base 42. The upper side wall 24 being of larger dimension allows the upper portion of the housing 21 to contain as much water in a smaller vertical space as required by lower housing 25 for the same volume of water. The result is that when only, say, half a pot is being brewed, the water level does not drop halfway from the full level to the housing bottom 28, but by a lesser vertical amount. This reduces the distance the water must be lifted by the pump 40 to achieve percolation to brew a partial pot. This in turn reduces the strength of pumping action required so that it is possible to brew a partial pot in the microwave oven.

The invention accordingly economically and effectively carries out the aforementioned objectives.

Having now therefore fully illustrated and described our invention, what we claim to be new and desire to protect by United States Letters Patent is:

1. A percolation-type coffee maker for use in a microwave oven, comprising:
   (a) a housing of microwave transparent material, said housing having an open upper end, a closed lower end and having first and second generally cylindrical portions of first and second radii, respectively and concentrically disposed one above the other and joined at a juncture zone defining a shoulder extending substantially parallel to said radii, with the first portion disposed above the second portion, and said first radius being larger than said second radius;
   (b) a cover member for closing said open upper end of said housing;
   (c) a percolator pump having a circular domed base of a diameter insertable into said second portion of said housing and adapted to rest upon said closed lower end, and a vertical tubular member projecting upwardly from said domed base, the lumen of said tubular member communicating with the volume between the underside of said domed base and the closed lower end; and
   (d) a perforated metal basket for containing ground coffee detachably mounted on said tubular member, said basket being cylindrical and having a basket radius intermediate said first and second radii, said percolator pump supporting said basket in said first portion of said housing and beneath said cover, said metal basket substantially shielding said coffee grounds from exposure to microwave energy.

2. The percolation-type coffee maker as in claim 1 and further including support means integrally formed on said housing for elevating said closed lower end of said housing a predetermined distance above the floor of the microwave oven for increasing the exposure of said closed lower end of said housing to microwave energy, said support means having a support radius greater than said second radius.

3. The percolation-type coffee maker as in claim 1 wherein said cover is made at least partially of metal and when closing said open upper end of said housing, engages a portion of said basket for effectively shielding the interior of said basket from microwaves, and wherein said tubular member supports said basket near the top of said housing and substantially above said shoulder.

* * * * *